United States Patent
Miyake et al.

(10) Patent No.: US 7,896,278 B2
(45) Date of Patent: Mar. 1, 2011

(54) WINDING APPARATUS

(75) Inventors: Hideaki Miyake, Nisshin (JP); Shingo Hashimoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 259 days.

(21) Appl. No.: 12/279,209

(22) PCT Filed: Oct. 10, 2007

(86) PCT No.: PCT/JP2007/070222
§ 371 (c)(1),
(2), (4) Date: Aug. 13, 2008

(87) PCT Pub. No.: WO2008/062619
PCT Pub. Date: May 29, 2008

(65) Prior Publication Data
US 2009/0001211 A1    Jan. 1, 2009

(30) Foreign Application Priority Data
Nov. 21, 2006  (JP) .................................. 2006-313836

(51) Int. Cl.
*B65H 51/20*   (2006.01)
*H02K 15/04*   (2006.01)
(52) U.S. Cl. .................................. 242/365.3; 242/441.4
(58) Field of Classification Search ............... 242/433.2, 242/433.1, 472.6, 538, 538.1, 433.3, 433.4, 242/437, 445, 439.1, 441.4, 440, 440.1, 439.2, 471, 364–366.4, 361.2, 361.3
See application file for complete search history.

(56) References Cited

U.S. PATENT DOCUMENTS

| 3,476,330 A | 11/1969 | Curtland |
| 4,448,015 A * | 5/1984 | Usui .......................... 242/441.3 |
| 7,520,120 B2 * | 4/2009 | Saito et al. ........................ 57/10 |

FOREIGN PATENT DOCUMENTS

| GB | 1 069 134 A | 5/1967 |
| GB | 1 241 695 A | 8/1971 |
| JP | 2000-134876 A | 5/2000 |
| JP | 2000-354354 A | 12/2000 |
| JP | 2008-022696 A | 1/2008 |
| WO | WO 2006075762 A1 * | 7/2006 |

* cited by examiner

*Primary Examiner* — Michael R Mansen
*Assistant Examiner* — William E Dondero
(74) *Attorney, Agent, or Firm* — Kenyon & Kenyon LLP

(57) ABSTRACT

A wiring apparatus includes a spool; an annular reel surrounding the spool to be rotatable about an axis common with the spool, the reel being previously wound with a wire in layers to be wound on the spool; a winding arm for guiding the wire from the reel to the spool and placed outside the reel so as to be movable around the spool about the axis; a first motor and others for driving the winding arm and others to move around the spool to wind the wire on the spool; and a second motor and others for driving the reel to rotate on the axis to unreel the wire of a required length from the reel during driving of the first motor.

6 Claims, 2 Drawing Sheets

WINDING APPARATUS

This is a 371 national phase application of PCT/JP2007/070222 filed 10 Oct. 2007, claiming priority to Japanese Patent Application No. 2006-313836 filed 21 Nov. 2006, the contents of which are incorporated herein by reference.

TECHNICAL FIELD

The present invention relates to a winding apparatus for winding a wire on a spool and, more particularly, to a winding apparatus for winding a wire on a spool by rotating a reel.

BACKGROUND ART

Heretofore, as this type of apparatus, an apparatus disclosed in for example JP2000-354354A is known. This apparatus is arranged such that a reel on which a winding material is previously wound in layers is moved around an object to be wound with the winding material and simultaneously is rotated on its axis, thereby winding the winding material on the object for winding.

DISCLOSURE OF INVENTION

Problems to be Solved by the Invention

However, the apparatus disclosed in JP2000-354354A has the following disadvantages. Since the reel is heavy, centrifugal force is applied to the reel which moves around an object, and also the weight of the reel changes as a winding operation advances. Accordingly, the reel could not be rotated stably at high speed. Specifically, when the reel is controlled to move around the object and rotate on its axis at high speed, the inertia of the reel becomes a problem at the time of acceleration and deceleration. Further, the weight of the reel changes as the winding material is wound on the object for winding, so that the reel becomes unbalanced. The above problems will similarly be caused in the case where the winding material is a wire, which is to be wound on a spool serving as an object for winding while the reel is moved around the spool and rotated on its axis.

The present invention has been made in view of the above circumstances and has an object to provide a winding apparatus allowing a reel previously wound thereon with a wire which will be wound on a spool to rotate stably at high speed.

Means for Solving the Problems

To achieve the above object, one aspect of the present invention provides a winding apparatus including: a spool on which a wire will be wound; a reel arranged in annular shape surrounding the spool in such a manner as to be rotatable about an axis common with the spool, the reel being previously wound with the wire in layers to be wound on the spool; a guide member for guiding the wire from the reel to the spool, the guide member being disposed outside the reel in such a manner as to be movable around the spool about the axis; first drive means for driving the guide member to move around the spool for winding the wire on the spool; and second drive means for driving the reel to rotate about the axis for unreeling the wire of a required length from the reel during driving of the first drive means.

According to the above configuration, the reel placed in annular shape surrounding the spool can be rotated on an axis common with the spool. On the reel, the wire to be wound on the spool is previously wound in layers. The guide member for guiding the wire from the reel to the spool is disposed outside the reel in such a manner as to be movable around the spool about the axis common with the spool. When the first drive means is activated to wind the wire on the spool, the guide member is caused to move around the spool. During driving of this first drive means, the second drive means is operated to rotate the reel on the axis to unreel the wire of a necessary length from the reel. Accordingly, for winding the wire on the spool, the guide member is driven to move around the spool and simultaneously the reel is driven to rotate on the axis. Thus, the wire of a required length is unreeled from the reel and then wound on the spool. Here, the reel is arranged in annular shape centered about the axis common with the spool and driven to rotate on the axis in a place around the spool. Therefore, regardless of the amount of wire remaining on the reel, the reel can be balanced in weight and stably driven to rotate. The guide member driven to move around the spool only guides the wire unreeled from the reel without making the wire be wound on the guide member itself. Thus, the guide member can be light in weight.

Consequently, the reel previously wound with the wire in layers to be wound on the spool can be rotated stably at high speed.

Preferably, the above winding apparatus further includes a holding frame for holding the reel and the guide member so that they can be driven separately, wherein the first drive means and the second drive means are mounted on the holding frame, and when the first drive means and the second drive means are operated, the reel is driven to rotate about the axis and the guide member is driven to move around the spool, separately.

According to the above configuration, the reel and the guide member can be supported by the same holding frame on which the first and second drive means are mounted. Accordingly, there is no need to provide any holding members for individually holding the reel, the guide member, the first drive means, and the second drive means. Further, it is possible to independently rotate the reel on the axis and move the guide member around the spool, so that winding of the wire on the spool and unreeling of the wire from the reel can be adjusted separately.

Consequently, the structure of the winding apparatus can be simplified and the control of an unreeling amount of the wire from the reel can be facilitated.

In the above winding apparatus, preferably, when the first drive means is operated, the guide member is driven to move around the spool to wind the wire on the spool, and when the second drive means is operated during driving of the first drive means, the reel is driven to rotate around the spool to unreel the wire of a required length to be wound on the spool.

According to the above configuration, the wire wound in layers in advance on the reel can smoothly be unreeled from the reel and also be smoothly wound on the spool.

Thus, the wire can be wound on the spool at high speed.

BEST MODE FOR CARRYING OUT THE INVENTION

Figure 1:
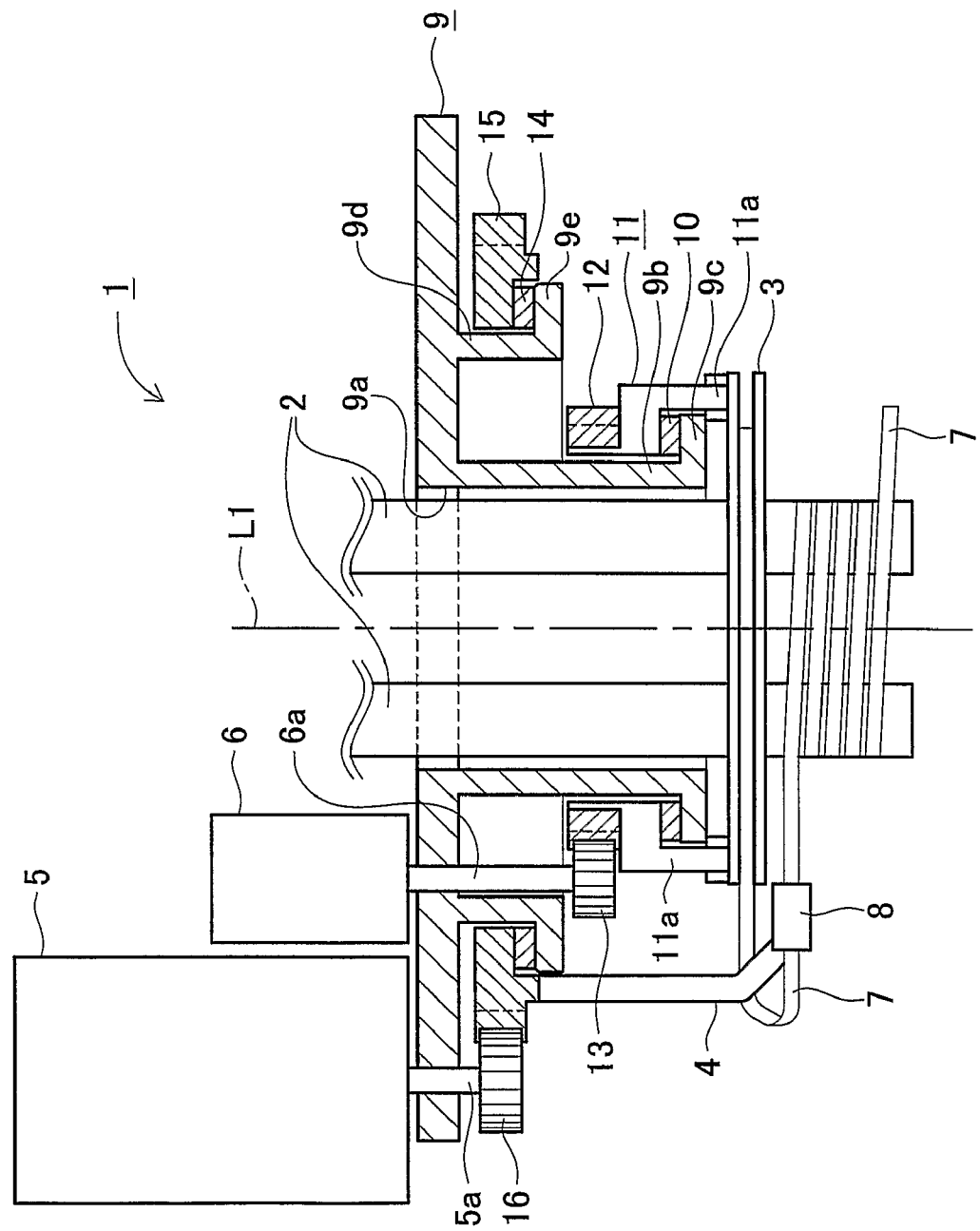
FIG. 1 is a schematic sectional front view of a winding apparatus of a preferred embodiment of the present invention.
Figure 2:
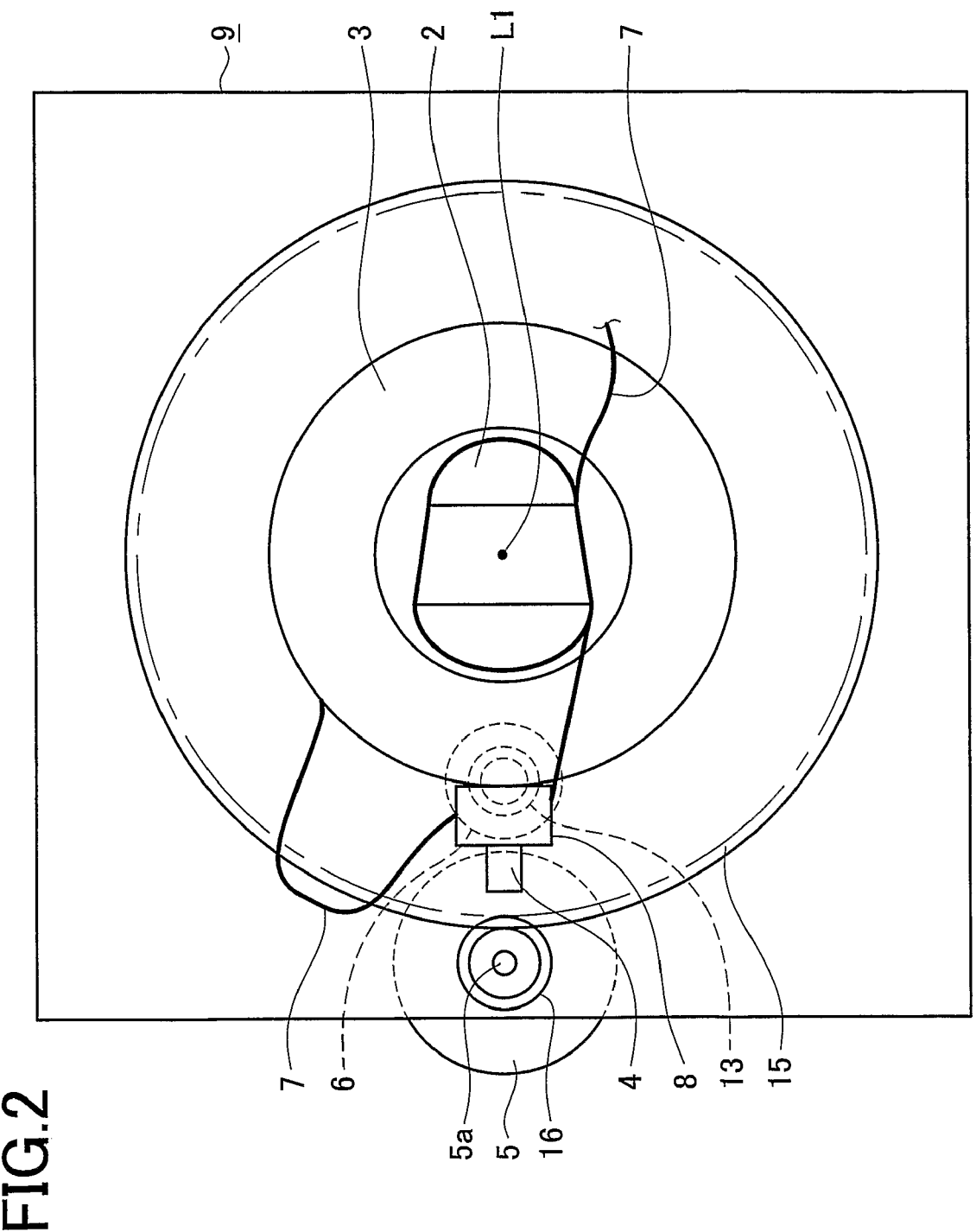
FIG. 2 is a schematic bottom view of the winding apparatus of FIG. 1.

A detailed description of a preferred embodiment of a winding apparatus embodying the present invention will now be given referring to the accompanying drawings. FIG. 1 is a schematic sectional front view of a winding apparatus 1 of the present embodiment. FIG. 2 is a schematic bottom view of the winding apparatus 1 seen from below. This winding apparatus 1 includes a spool 2, a reel 3, an arm 4 serving as a guide member of the present invention, a first motor 5, and a second motor 6. The spool 2 is placed in the center of the winding apparatus 1 and includes two straight bars arranged in parallel. The spool 2 will be wound thereon with wire 7. The wire 7 is supplied to form a coil for constituting a stator of an electric motor or the like. In the present embodiment, the wire 7 is composed of a plurality of parallel wires. The reel 3 is provided in annular shape surrounding the spool 2 in such a manner as to be rotatable about an axis L1 common with the spool 2. The reel 3 is previously wound thereon with the wire 7 in layers which will be wound on the spool 2. The winding arm 4 is disposed outside the reel 3 in such a manner as to be movable around the spool 2 about the axis L1 for guiding the wire 7 from the reel 3 to the spool 2. At a lower end of the winding arm 4, a tension generator 8 is provided. This tension generator 8 serves to apply tension to the wire 7 unreeled from the reel 3 so that the wire 7 is wound under tension on the spool 2. As shown in FIG. 2, the wire 7 unreeled from the reel 3 is somewhat loose and made pass through the tension generator 8. The first motor 5 is used to move the winding arm 4 around the spool 2 for winding the wire 7 on the spool 2. The second motor 6 is used to rotate the reel 3 for unreeling the wire 7 of a required length from the reel 3 during driving of the first motor 5.

In the present embodiment, a part of the wire 7 is wound several turns on the spool 2 and then unwound from the spool 2. The wire 7 unwound from the spool 2 is to be wound on a predetermined bobbin or the like. In the present embodiment, in a system for winding the wire 7 on a bobbin or the like in order to form a coil to be installed in a stator of an electric motor, regular winding and reverse winding are adopted as a winding manner of the wire 7. Here, to prevent the wire 7 from twisting due to the regular winding and the reverse winding, the winding apparatus 1 is disposed so that the spool 2 is positioned between the reel 3 and the bobbin or the like to wind a part of the wire 7 on the spool 2 temporarily before the wire 7 is wound on the bobbin or the like, thereby removing twisting of the wire 7.

The winding apparatus 1 is further provided with a holder 9 (a holding frame) configured to hold the reel 3 and the winding arm 4 so that they are driven separately. The holder 9 is rectangular in plan view. On this holder 9, the first motor 5 and the second motor 6 are individually supported. The holder 9 has a center hole 9a through which the spool 2 is vertically inserted. The holder 9 is further formed with an inner cylindrical part 9b extending downward, defining the center hole 9a. At a lower end of the inner cylindrical part 9b, a flange 9c is formed extending radially outward. On this flange 9c, a reel holding unit 11 is mounted through a bearing 10. The reel holding unit 11 includes a plurality of brackets 11a each extending downward. The reel 3 is held on the lower ends of the brackets 11a. The brackets 11a and the reel 3 are connected to each other with a collet chuck for example. The reel holding unit 11 includes a ring gear 12 placed around the inner cylindrical part 9b. The ring gear 12 is drivingly engaged with a gear 13 fixed to an output shaft 6a of the second motor 6. Accordingly, when the second motor 6 is activated, the reel holding unit 11 is rotated via the gear 13 and the ring gear 12, causing the reel 3 to rotate on its axis, around the spool 2. In the present embodiment, the second motor 6, the ring gear 12, and the gear 13 constitute a second drive means of the present invention.

The holder 9 is further formed with an outer cylindrical part 9d extending downward and surrounding the inner cylindrical part 9b. The outer cylindrical part 9d is shorter than the inner cylindrical part 9b. At a lower end of the outer cylindrical part 9d, a flange 9e is formed extending radially outward. On this flange 9e, a ring gear 15 is mounted through a bearing 14. The aforementioned winding arm 4 is integrally connected to the ring gear 15. This ring gear 15 is drivingly engaged with a gear 16 fixed to an output shaft 5a of the first motor 5. Accordingly, when the first motor 5 is activated, the ring gear 15 is rotated via the gear 16, causing the winding arm 4 to move around the spool 2. In the present embodiment, the first motor 5, the ring gear 15, and the gear 16 constitute a first drive means of the present invention. As described above, driving of the first motor 5 and the second motor 6 allows the reel 3 to rotate on its axis and move the winding arm 4 around the spool 2, separately.

According to the winding apparatus 1 of the present embodiment mentioned above, the reel 3 arranged in annular shape surrounding the spool 2 is rotated about the axis L1 common with the spool 2. The reel 3 is wound with the wire 7 in layers in advance which will be wound on the spool 2. The winding arm 4 and the tension generator 8 for guiding the wire 7 from the reel 3 to the spool 2 are disposed outside the reel 3 in such a manner as to be movable around the spool 2 about the axis L1 common with the spool 2. When the wire 7 is to be wound on the spool 2, the first motor 5 is activated to drive the winding arm 4 and the tension generator 8 to move around the spool 2. During driving of the first motor 5, the second motor 6 is driven to rotate the reel 3 about the axis L1, around the spool 2, to unreel the wire 7 of a required length from the reel 3.

Consequently, for winding the wire 7 on the spool 2, the winding arm 4 and the tension generator 8 are moved around the spool 2 and simultaneously the reel 3 is rotated about the spool 2, thereby winding the wire 7 of a required length unreeled from the reel 3 on the spool 2. At this time, the wire 7 to be wound on the spool 2 is applied with appropriate tension by the tension generator 8, so that the tense wire 7 can be wound tightly on the spool 2. An end of the wire 7 wound on the spool 2 is then unwound from the spool 2 and wound on a predetermined bobbin or the like. As the wire 7 previously wound on the reel 3 is unreeled, the amount of the wire 7 remaining on the reel 3 is gradually reduced. In the present embodiment, the reel 3 is placed in annular shape centered about the axis L1 common with the spool 2 and driven to rotate about the axis L1, around the spool 2. Accordingly, regardless of the amount of the wire 7 remaining on the reel 3, the reel 3 can be balanced in weight and therefore be driven to rotate stably. In other words, irrespective of changes in weight, the reel 3 is allowed to stably rotate on the axis L1, around the spool 2, and therefore the changes in weight of the reel 3 do not affect the rotation of the reel 3. Accordingly, the reel 3 previously wound with the wire 7 to be wound on the spool 2 can be rotated stably at high speed. In this regard, the time needed for a process of winding the wire 7 to form a coil can be reduced. Further, the winding arm 4 and the tension generator 8 which are moved around the spool 2 are used only to guide the wire 7 unreeled from the reel 3 without winding the wire 7 on the arm 4 and the tension generator 8 themselves. Thus, the total weight of the arm 4 and the tension generator 8 can be reduced. In this regard, the arm 4 and the tension generator 8 are allowed to move at high speed in correspondence with the high-speed rotation of the reel 3.

In the present embodiment, the reel 3 and the winding arm 4 are held by the same holder 9 and also the first motor 5 and the second motor 6 are supported on the same holder 9.

Therefore, there is no need for any special holding members for individually holding the reel 3, the winding arm 4, the first motor 5, and the second motor 6. The winding apparatus 1 can thus be simplified in structure and reduced in size. Since the reel 3 is rotated on the axis L1 and the winding arm 4 is moved around the spool 2 separately, the winding of the wire 7 on the spool 2 and the unreeling of the wire 7 from the reel 3 can be controlled independently. Regardless of the winding speed of the wire 7 on the spool 2, consequently, it is possible to easily control an unreeling amount of the wire 7 from the reel 3.

In the present embodiment, when the first motor 5 is driven, the winding arm 4 is moved around the spool 2, thereby winding the wire 7 on the spool 2. During driving of the first motor 5, the second motor 6 is also driven to rotate the reel 3 on the axis L1, around the spool 2, thereby unreeling the wire 7 of a required length to be wound on the spool 2 from the reel 3. Accordingly, the wire 7 previously wound on the reel 3 can be wound smoothly on the spool 2 by being unreeled smoothly from the reel 3. It is therefore possible to wind the wire 7 unreeled from the reel 3 on the spool 2 at high speed.

In the present embodiment, the reel 3 is only rotated at a place around the spool 2 as mentioned above. As compared with an apparatus arranged to drive a reel to move around a spool through a planetary gear, therefore, a mechanism for driving the reel 3 can relatively simply be constituted of the second motor 6, the ring gear 12, and the gear 13.

In the present embodiment, when the reel 3 runs out of the wire 7, the reel 3 is allowed to be detached from the reel holding unit 11 and replaced with a new one previously wound with the wire 7.

The present invention is not limited to the above embodiment and may be embodied in other specific forms without departing from the spirit or essential characteristics thereof.

For instance, in the above embodiment, the components such as the reel 3, the winding arm 4, the first motor 5, and the second motor 6 are assembled to the single holder 9, but may be assembled to two or more holding members.

In the above embodiment, the reel 3 and the winding arm 4 are arranged so that they are respectively rotated on its axis and moved around the spool 2 separately. Alternatively, the rotation of the reel and the movement of the guide member may be caused in synchronization with each other.

The invention claimed is:

1. A winding apparatus including:
a spool on which a part of a wire will be wound several turns and then unwound from the spool;
a reel arranged in annular shape surrounding the spool in such a manner as to be rotatable about an axis common with the spool, the reel being previously wound with the wire in layers to be wound on the spool;
a guide member for guiding the wire from the reel to the spool, the guide member being disposed outside the reel in such a manner as to be movable around the spool about the axis;
a first driving device to drive the guide member to move around the spool for winding the wire on the spool; and
a second driving device to drive the reel to rotate about the axis for unreeling the wire of a required length from the reel during driving of the first driving device.

2. The winding apparatus according to claim 1 further including a holding frame for holding the reel and the guide member so that they can be driven separately,
wherein the first driving device and the second driving device are mounted on the holding frame, and
when the first driving device and the second driving device are operated, the reel is driven to rotate about the axis and the guide member is driven to move around the spool, separately.

3. The winding apparatus according to claim 2, wherein when the first driving device is operated, the guide member is driven to move around the spool to wind the wire on the spool, and when the second driving device is operated during driving of the first driving device, the reel is driven to rotate around the spool to unreel the wire of a required length to be wound on the spool.

4. The winding apparatus according to claim 1 further including a tension generator attached to the guide member and arranged to be movable around the spool about the axis to apply tension to the wire unreeled from the reel before the wire is wound on the spool,
wherein the tension generator is driven by the first driving device.

5. The winding apparatus according to claim 1 wherein the spool includes at least two bars arranged substantially parallel to one another.

6. A winding apparatus including:
a spool on which a part of a wire will be wound several turns and then unwound from the spool, the spool including at least two bars arranged substantially parallel to one another on which a wire will be wound;
a reel arranged in annular shape surrounding the spool in such a manner as to be rotatable about an axis common with the spool, the reel being previously wound with the wire in layers to be wound on the spool;
a guide member for guiding the wire from the reel to the spool, the guide member being disposed outside the reel in such a manner as to be movable around the spool about the axis;
a first driving device to drive the guide member to move around the spool for winding the wire on the spool;
a second driving device to drive the reel to rotate about the axis for unreeling the wire of a required length from the reel during driving of the first driving device; and
a holding frame for holding the reel and the guide member so that they can be driven separately.

* * * * *